US011912481B2

(12) United States Patent
Karan et al.

(10) Patent No.: US 11,912,481 B2
(45) Date of Patent: Feb. 27, 2024

(54) METHOD OF SEALING A LID TO A CONTAINER USING A REMOVEABLE SEALING STRIP

(71) Applicant: KENCO® LABEL & TAG CO., LLC, Milwaukee, WI (US)

(72) Inventors: Aharon A. Karan, Glendale, WI (US); Tzvi Eckhardt, Milwaukee, WI (US)

(73) Assignee: Kenco Label & Tag Co., LLC, Milwaukee, WI (US)

( * ) Notice: Subject to any disclaimer, the term of this patent is extended or adjusted under 35 U.S.C. 154(b) by 288 days.

(21) Appl. No.: 17/161,896

(22) Filed: Jan. 29, 2021

(65) Prior Publication Data

US 2022/0242633 A1 Aug. 4, 2022

(51) Int. Cl.

*B65B 7/28* (2006.01)
*B65D 55/08* (2006.01)
*B65C 9/46* (2006.01)

(52) U.S. Cl.

CPC ........ *B65D 55/0818* (2013.01); *B65B 7/2864* (2013.01); *B65C 9/46* (2013.01)

(58) Field of Classification Search

CPC ....... B65B 7/28; B65B 7/2835; B65B 7/2864; B65B 51/06; B65D 55/08; B65D 55/0818; B65C 3/18; B65C 3/20; B65C 9/46; G09F 2003/0273
USPC ................... 53/419, 420, 137.2; 40/310, 311
See application file for complete search history.

(56) References Cited

U.S. PATENT DOCUMENTS 1,954,568 A * 4/1934 Kenny ................. B65D 43/021 220/658
2,334,224 A * 11/1943 Socke ................... B65B 7/2864 53/138.1
3,309,255 A * 3/1967 Brody ........................ B65C 9/46 156/518
3,334,776 A * 8/1967 Ellis ................... B65D 55/0818 220/260
3,396,899 A * 8/1968 Strouse et al. ..... B65D 55/0818 229/125.05
3,403,810 A * 10/1968 Kehe .................. B65D 55/0818 229/123.1
3,555,764 A * 1/1971 Dowling ............... B65B 7/2864 53/73
5,048,711 A * 9/1991 Weiss et al. .......... G09F 3/0288 215/230
9,524,659 B2 * 12/2016 Barry ........................ B65C 3/16
(Continued)

*Primary Examiner* — Stephen F. Gerrity
(74) *Attorney, Agent, or Firm* — Boyle Fredrickson, S.C.

(57) ABSTRACT

A removable sealing strip and method is provided for sealing a lid removably secured to a top portion of a container. The removable sealing strip includes a strip removably affixed to a substrate and has a first portion extending from a first end thereof, a second portion extending from the first portion, and a third portion extending between the second portion of the strip and a second end thereof. The strip is foldable along a fold line such that an inner surface of the first portion of strip binds to an to inner surface of the second portion of the strip so as to define a tab on the strip. The inner surface of the third portion of the strip is affixable to the lid and to the top portion of the container to substantially inhibits removal of the lid from the top portion of the container. The tab is configured to facilitate removal of the third portion of the strip from the lid and the top portion of the container.

18 Claims, 5 Drawing Sheets

(56) References Cited

U.S. PATENT DOCUMENTS

| | | | | |
|---|---|---|---|---|
| 2003/0230577 | A1 | 12/2003 | Smith | |
| 2016/0130055 | A1 * | 5/2016 | Labonski | B65C 3/08 53/415 |
| 2016/0232820 | A1 * | 8/2016 | Koltchine et al. | B65D 43/021 220/658 |

* cited by examiner

METHOD OF SEALING A LID TO A CONTAINER USING A REMOVEABLE SEALING STRIP

FIELD OF THE INVENTION

This invention relates to generally to the sealing of containers, and in particular, to a method and a sealing strip that may be used to provide a seal between a lid and a corresponding container and that may be simply and easily removed therefrom.

BACKGROUND AND SUMMARY OF THE INVENTION

As is known, various types of sealants are used to seal containers, such as bottles, jars or the like. These tamper-resistant sealants have a wide variety of purposes, including preventing leakage and spillage of a product from the container during shipping and handling, preventing tampering of product within the container, isolating the product from the environment external to the container and preventing the entry of contaminants into the container.

By way of example, a piece of sealing tape or a strip may be used to provide a seal between a lid and a corresponding container housing a product. Smith, United States Patent Publication No. 2003/0230577 discloses a method for inhibiting the leakage of a container during handling or shipping. The container has a body that defines a base portion and a top portion to which a lid is removably secured. A sealing label is adhesively attached to the lid and container body to inhibit the loosening of the lid. For example, in one embodiment, the sealing label includes a polyolefin film facestock and a rubber-based adhesive that is solvent-resistant.

While functional for its intended purposed, the sealing label and the method associated therewith disclosed in the Smith '577 publication has certain disadvantages. More specifically, the bond of the adhesive utilized to affix the sealing label to the lid and container body must be of a sufficient magnitude to adequately seal the lid and container body with the sealing label to inhibit the loosening of the lid. However, due to the high adhesive bond of the adhesive, it is very difficult to remove the sealing label from the lid and container body when a user needs to initially remove the lid. As such, a need currently exists for an inexpensive and efficient sealing strip that may be used to provide a seal between a lid and a corresponding container and that may be simply and easily removed therefrom.

Therefore, it is a primary object and feature of the present invention to provide a sealing strip that may be used to a seal between a lid and a corresponding container and that may be simply and easily removed therefrom.

It is a further object and feature of the present invention to provide a method for sealing a lid and a corresponding container with a sealing strip that allows for the sealing strip to be simply and easily removed therefrom after use.

It is a still further object and feature of the present invention to provide a sealing strip used as a seal between a lid and a corresponding container that is simple to utilize and inexpensive to manufacture.

In accordance with the present invention, a removeable sealing strip is provided for sealing a lid removably secured to a top portion of a container. The removeable sealing strip includes a substrate having an outer surface and an inner surface. A strip has first and second ends, an inner surface removably bonded to the inner surface of the substrate, and an outer surface. The strip is defined by a first portion extending from the first end of the strip, a second portion extending from the first portion, and a third portion extending between the second portion of the strip and the second end of the strip. A fold line is provided at the intersection of the first and second portions of the strip. First indicia is provided on the outer surface of the first portion of the strip. The first indicia includes a first mark optically directing a user to the fold line. Second indicia is provided on the outer surface of the second portion of the strip. The second indicia includes a second mark optically directing a user to the fold line. The strip, when removed from the substrate, is foldable along the fold line such that the inner surface of the first portion of strip is configured to be bound to inner surface of the second portion of the strip such that the first portion and the second portion define a tab.

An adhesive is disposed on the inner surface of the first, second and third portions of the strip. The adhesive on the inner surface of the third portion of the strip is configured to attach to and interconnect the lid to the top portion of the container such that adhesive attachment of the adhesive to the lid to the top portion of the container substantially inhibits removal of the lid from the top portion of the container. The tab is configured to facilitate removal of the third portion of the strip from the lid and the top portion of the container.

The fold line may defined a plurality of axially spaced perforations extending between a first side and a second side of the strip. Alternatively, the fold line may defined by a line printed on the outer surface of the strip and extending between a first side and a second side of the strip. The first indicia includes an arrow head directed at the fold line. Similarly, the second indicia includes an arrow head directed at the fold line. A non-binding layer of material is affixed to the inner surface of the substrate to facilitate the selective removal of the label from the substrate. The material is one of silicone and wax. Third indicia may be provided on the outer surface of the third portion of the strip to optically define the third portion of the strip.

In accordance with a further aspect of the present invention, a method for sealing a lid removably secured to a top portion of a container is provided. The method includes the step of providing a strip having first and second ends. The strip also includes a first portion extending from the first end of the strip, a second portion extending from the first portion, and a third portion extending between the second portion of the strip and the second end of the strip. The strip is folded such that an inner surface of the first portion of strip binds to an to inner surface of the second portion of the strip so as to define a tab on the strip. An inner surface of the third portion of the strip is affixed to the lid and to the top portion of the container to substantially inhibit removal of the lid from the top portion of the container. The tab is configured to facilitate removal of the third portion of the strip from the lid and the top portion of the container.

First indicia is printed on an outer surface of the first portion of the strip. The first indicia includes a first mark optically directing a user to a fold line on the strip. The first indicia may include an arrow head directed at the fold line. Second indicia may be printed on an outer surface of the second portion of the strip. The second indicia includes a first mark optically directing a user to a fold line on the strip. The second indicia may include an arrow head directed at the fold line.

An adhesive may be deposited on the inner surface of the first, second and third portions of the strip. The adhesive on the inner surface of the third portion of the strip is configured to attach to and interconnect the lid to the top portion of the container such that the adhesive attachment of the adhesive to the lid to the top portion of the container substantially inhibits removal of the lid from the top portion of the container. A plurality of perforations may be die cut in the strip to define the fold line. Alternatively, a line may be printed on the outer surface of the strip to define the fold line. Indicia may be printed on an outer surface of the third portion of the strip to optically designate the third portion of the strip.

In accordance with a still further aspect of the present invention, a method is provided for sealing a lid removably secured to a top portion of a container. The method includes the step of providing a strip having first and second ends. The strip includes a first portion extending from the first end of the strip, a second portion extending from the first portion, and a third portion extending between the second portion of the strip and the second end of the strip. First indicia is printed on an outer surface of the first portion of the strip. The first indicia includes a first mark optically directing a user to a fold line on the strip. Second indicia is printed on an outer surface of the second portion of the strip. The second indicia includes a first mark optically directing a user to the fold line on the strip. The strip is folded along the fold line such that an inner surface of the first portion of strip binds to an inner surface of the second portion of the strip so as to define a tab on the strip. An inner surface of the third portion of the strip is affixed to the lid and to the top portion of the container to substantially inhibits removal of the lid from the top portion of the container.

The tab is configured to facilitate removal of the third portion of the strip from the lid and the top portion of the container. The first and second indices may include arrow heads directed at the fold line. An adhesive may be deposited on the inner surface of the first, second and third portions of the strip. The adhesive on the inner surface of the third portion of the strip is configured to attach to and interconnect the lid to the top portion of the container such that the adhesive attachment of the adhesive to the lid to the top portion of the container substantially inhibits removal of the lid from the top portion of the container. A plurality of perforations may be die cut in the strip to define the fold line. Alternatively, a line may be printed on the outer surface of the strip to define the fold line. Third indicia may be printed on an outer surface of the third portion of the strip to optically designate the third portion of the strip. The strip may removably bonded to a substrate. The substrate includes a non-binding layer of material affixed thereto.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

IN THE DRAWINGS

Figure 1:
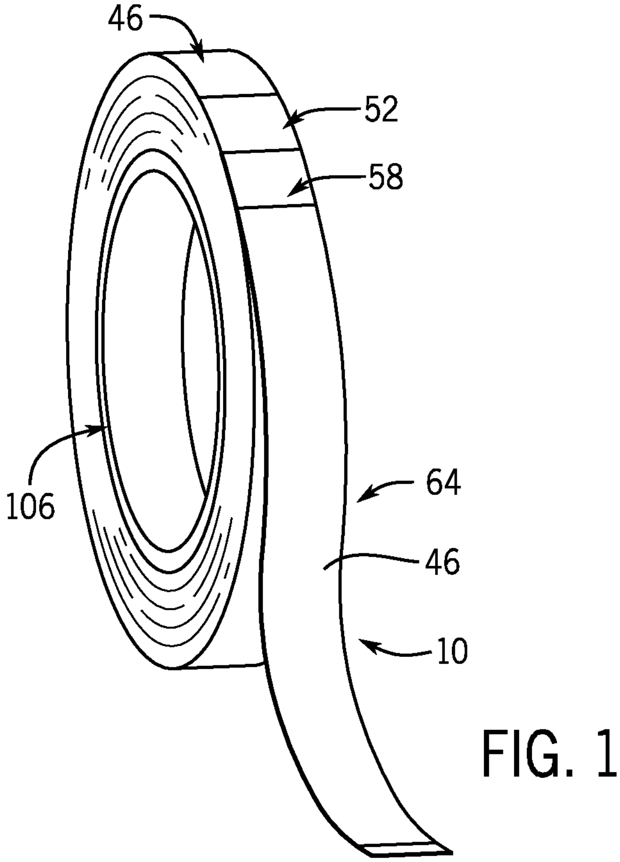
Figure 2:
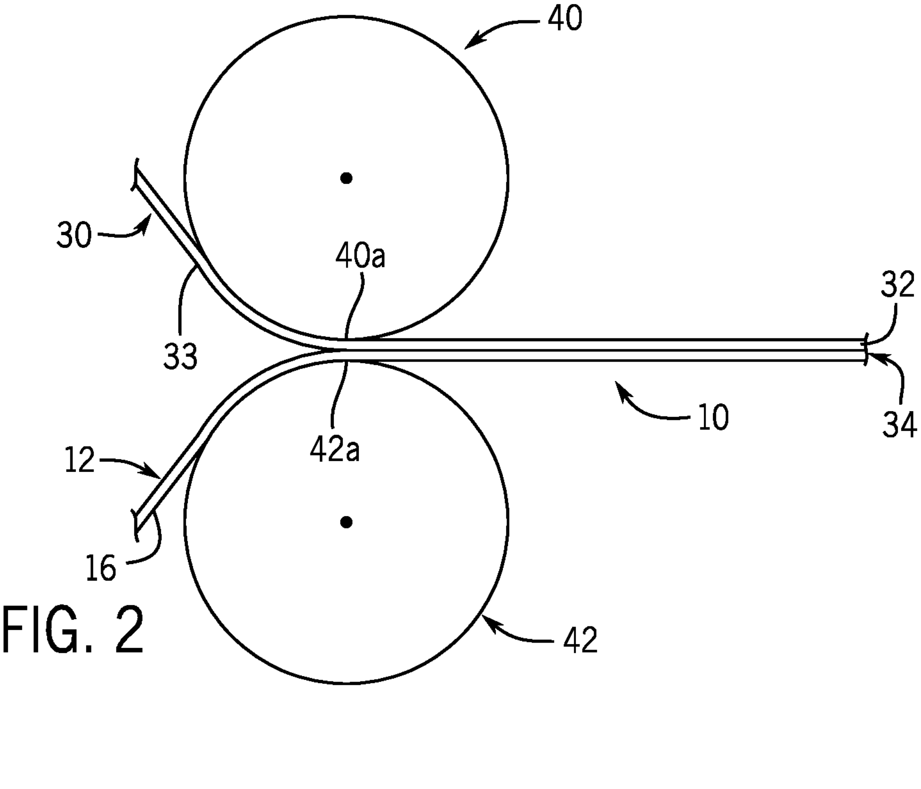
Figure 3:
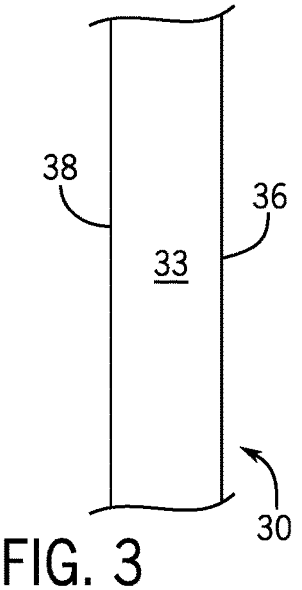
Figure 4:
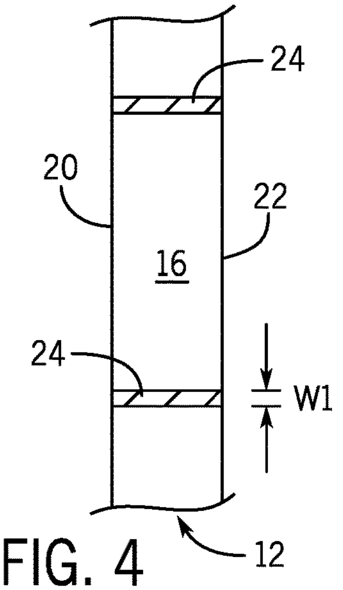
Figure 5:
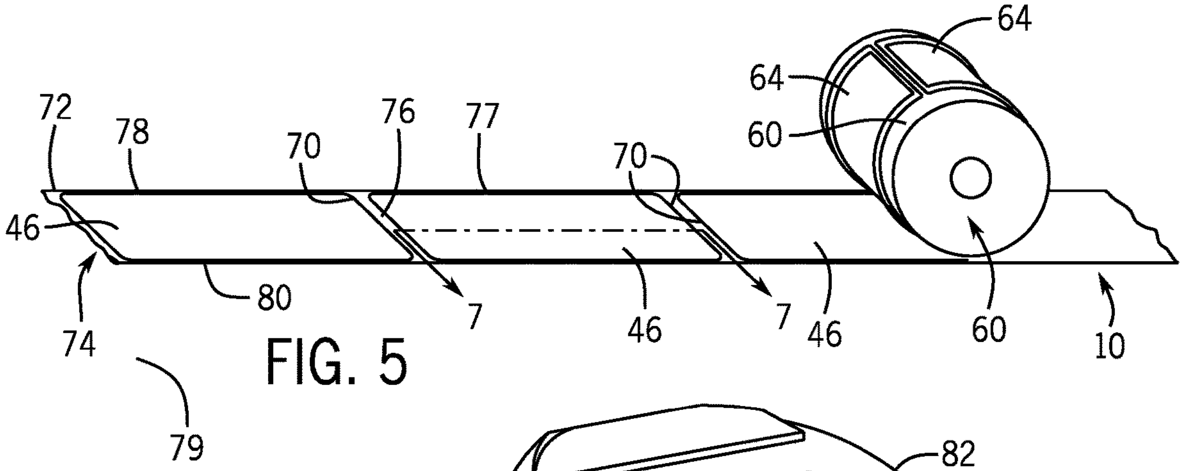
Figure 6:
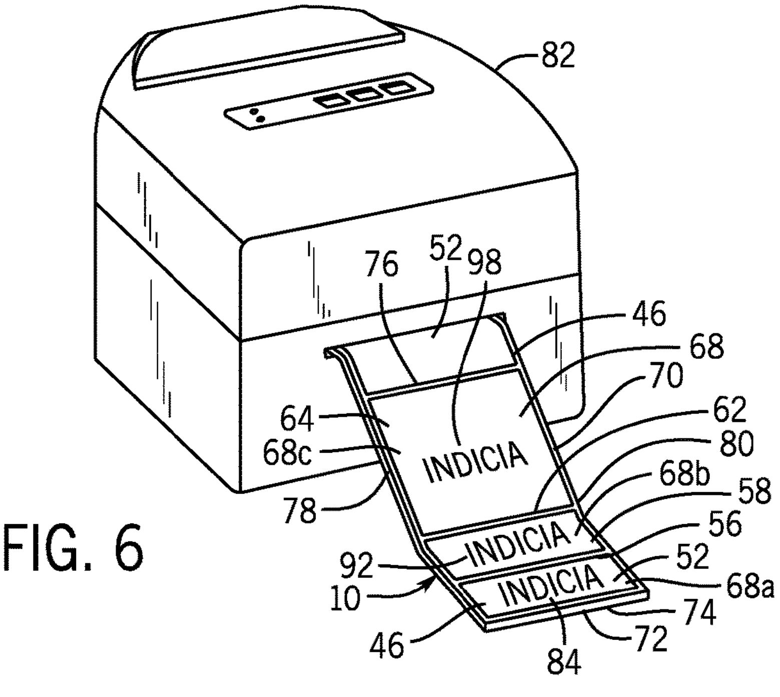
Figure 7:
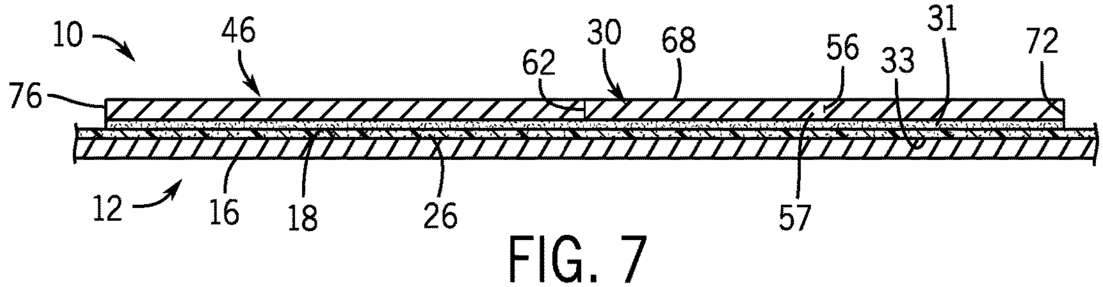
Figure 8:
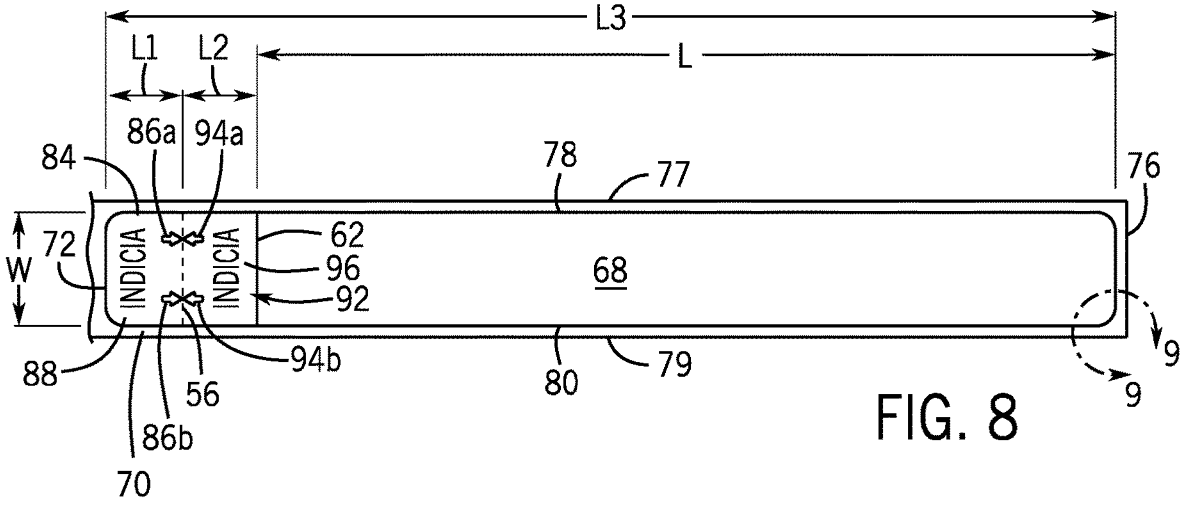
Figure 9:
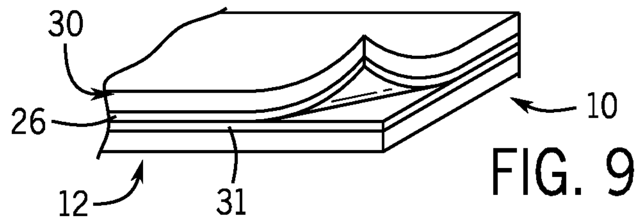
Figure 10:
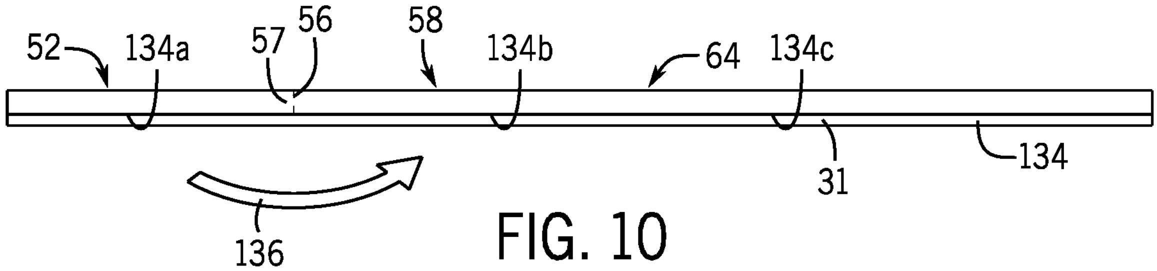
Figure 11:
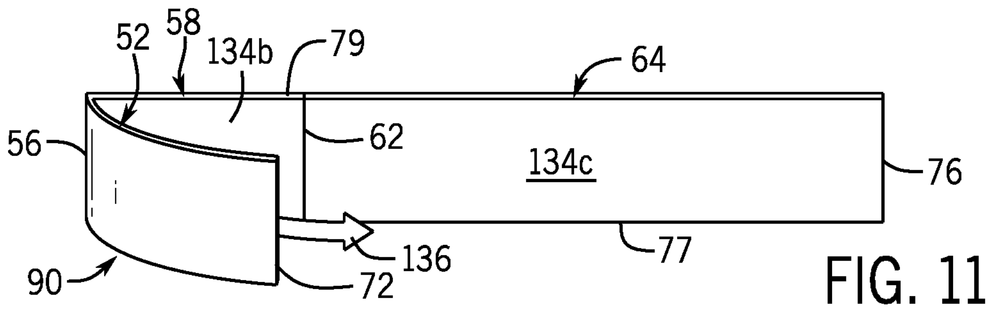
Figure 12:
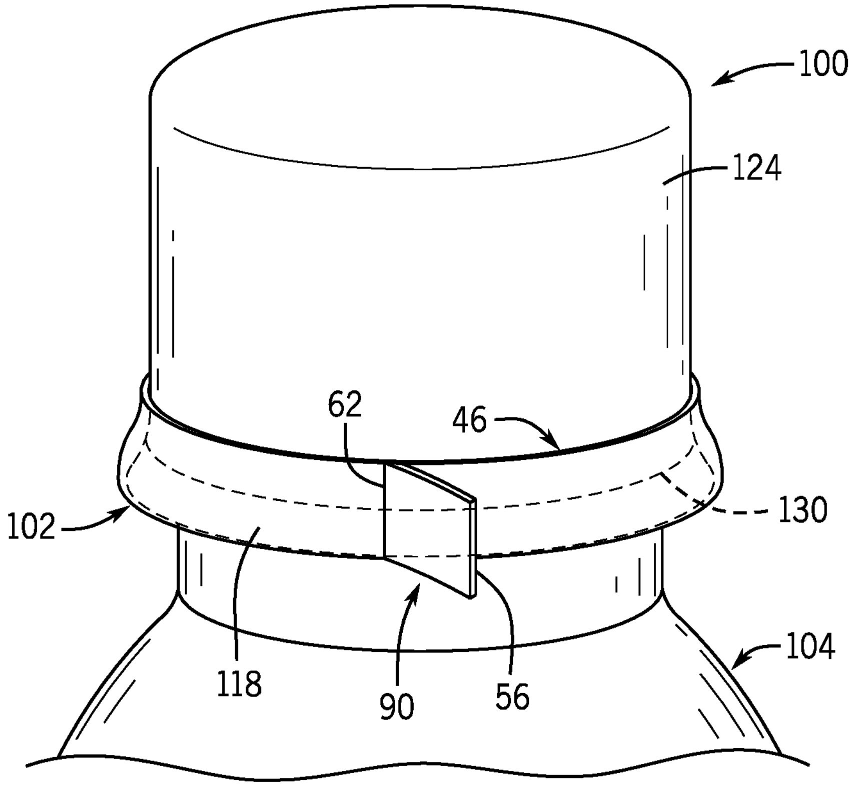
Figure 13:
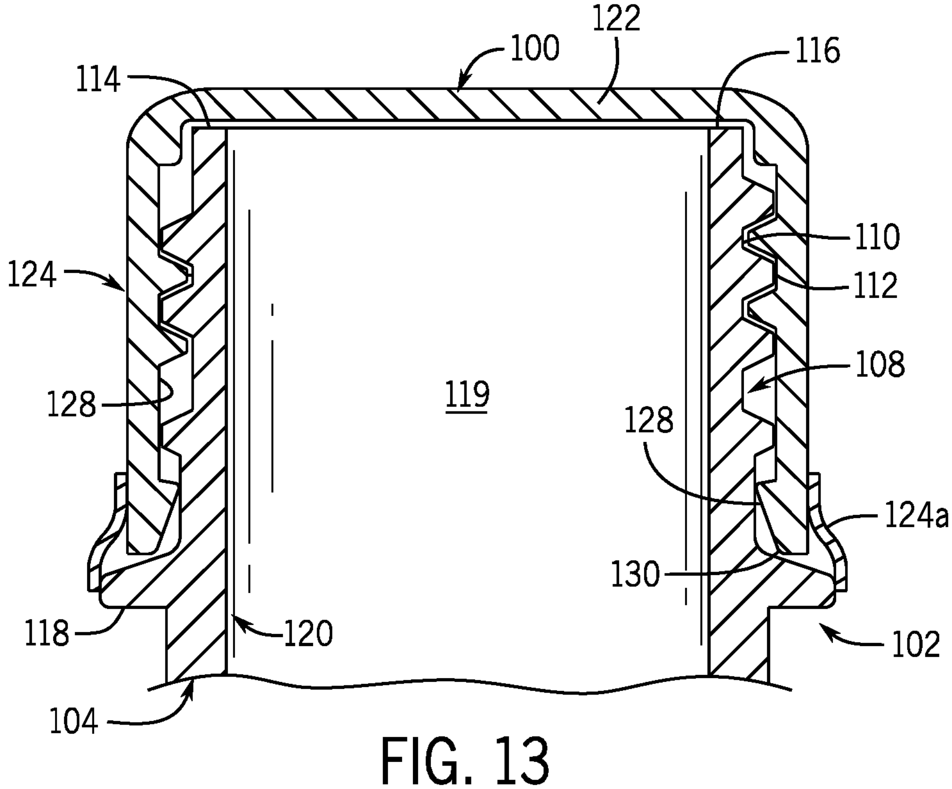

FIG. 1 is an isometric view of a roll of a label web including a plurality of removable sealing strips supported on a core in accordance with the present invention;

FIG. 2 is a schematic, side elevational view of showing an initial step in the fabrication of the label web of FIG. 1;

FIG. 3 is a top plan view of a portion of a web of label material used to fabricate the label web of FIG. 1;

FIG. 4 is a bottom plan view of a portion of a substrate used to fabricate the label web of FIG. 1;

FIG. 5 is a schematic view showing a further step in the fabrication of the label web of FIG. 1;

FIG. 6 is a schematic view showing a still further step in the fabrication of the label web of FIG. 1;

FIG. 7 is a cross-sectional view of the label web taken along line 7-7 of FIG. 5;

FIG. 8 is a top plan view of the label web of FIG. 1 showing an individual removable sealing strip;

FIG. 9 is an enlarged isometric view showing the layers of the label web of FIG. 8;

FIG. 10 is a cross-sectional view of a removable sealing strip in accordance with the present invention removed from a substrate of the label web;

FIG. 11 is an isometric view of the removable sealing strip of FIG. 10 being folded into a second configuration;

FIG. 12 is an isometric view of the removable sealing strip of FIG. 11 affixed to a lid and to a top portion of a container; and FIG. 13 is cross-sectional view of the lid and the top portion of the container taken along line 13-13 of FIG. 12.

DETAILED DESCRIPTION OF THE DRAWINGS

Referring to FIG. 1, a label web fabricated, as hereinafter described, is generally designated by the reference 10. Label web 10 includes substrate 12, FIGS. 2 and 4, defined by outer surface 16, inner surface 18, and first and second edges 20 and 22, respectively. First and second edges 20 and 22, respectively, of substrate 12 are generally parallel to each other. Registration marks 24 may be printed on outer surface 16 of substrate 12. By way of example, registration marks 24 may take the form of spaced stripes extending between first and second edges 20 and 22, respectively, of substrate 12. Registration marks 24 may have a user desired width W1. It can be appreciated that registration marks 24 may have other configurations without deviating from the scope of the present invention. Non-binding material 26, such as silicone or wax, is bonded to inner surface 18 of substrate 12, for reasons hereinafter described, FIG. 7.

As best seen in FIG. 2, in order to assemble label web 10, a web of label material 30 is positioned such that leading edge 32 of the web of label material 30 is aligned with leading edge 34 of substrate 12. In addition, first edge 36 of the web of label material 30 is aligned with first edge 20 of substrate 12 and such that second edge 38 of the web of label material 30 is aligned with second edge 22 of substrate 12. As best seen in FIG. 7, adhesive 31 is provided on inner surface 33 of the web of label material 30. Referring to FIG. 2, leading edges 32 and 34 of the web of label material 30 and substrate 12, respectively, are positioned between the nip points 40*a* and 42*a* of corresponding rollers 40 and 42, respectively. Rollers 40 and 42 are heated to a desired level, and thereafter, actuated such that the web of label material 30 and substrate 12 are fed between nip points 40*a* and 42*a* of rollers 40 and 42, respectively, thereby joining the web of label material 30 to substrate 12 and forming label web 10. Rollers 40 and 42 continue to rotate until all of the web of label material 30 and substrate 12 pass between nip portions 40*a* and 42*a* of rollers 40 and 42, respectively. It can be appreciated that the above describes one possible process for joining the web of label material 30 and substrate 12. However, other lamination processes are possible as being within the scope of the present invention.

Once label web 10 is fabricated, as heretofore described, it is contemplated to score or die cut labels 46 from the web of label material 30. More specifically, referring to FIG. 5, label web 10 passes through rotary die cutter 60. Die cutter

60 includes a plurality of dies 64 circumferentially spaced about outer surface 66 of die cutter 60. Dies 64, circumferentially spaced about outer surface 66 of die cutter 60, corresponds in size and shape to labels 46 to be die cut in the web of label material 30 of label web 10. In the depicted embodiment, it is intended for the size and shape of each of labels 46 to be die cut in the web of label material 30 of label web 10 to be substantially identical. However, it can be understood that the configurations of each of dies 64 circumferentially spaced about outer surface 66 of die cutter 60, and hence of labels 46, may be different without deviating from the scope of the present invention.

As label web 10 passes between die cutter 60 and a hardened anvil roll or plate (not shown), dies 64 provide corresponding perforations or cut lines 70, respectively, in the web of label material 30 of label web 10. In can be appreciated that cut lines 70 define a plurality of removable sealing strips/labels 46 in label web 10. Each cut line 70 includes a first section 72, generally parallel to first end 74 of label web 10, a second section 76 generally parallel and spaced from first section 72, and first and second side sections 78 and 80, respectively, generally perpendicular to first and second sections 72 and 76, respectively, of cut line 70 and parallel to first and second sides 77 and 79, respectively of label web 10. It can be understood that first section 72 and second section 76 of cut line 70 define a corresponding length L of each label 46 therebetween. Similarly, first and second side sections 78 and 80, respectively, of cut line 70 define a corresponding width W of each label 46 therebetween, FIG. 8.

To print on labels 46, a user positions a selected one of first end 74 and second end (not shown) of label web 10, e.g. first end 74, within the input of a printer, e.g. the input of a conventional ink jet printer 82, FIG. 6. As hereinafter described, as label web 10 is fed through ink jet printer 82, various indicia, fold line 56 and seal line 62 are printed on outer surface 52 of each label 46. Alternatively, fold line 56 may take the form of a plurality of perforations 57 spaced between first and second side sections 78 and 80, respectively, of cut line 70. It is intended for registration marks 24 on to be used to orientate label web 10 within printer 82 so as to insure the various indicia, fold line 56 and seal line 62 are properly aligned on a corresponding label 46. For reasons hereinafter described, each label 46 includes first portion 52 extending between first section 72 of cut line 70 and fold line 56; second portion 58 extending between fold line 56 and seal line 62; and third portion 64 extending from seal line 62 to second section 76 of cut line 70 of a corresponding label 46.

Fold line 56 is generally parallel to and spaced from first section 72 of cut line 70 such that the distance between fold line 56 and first section 72 of cut line 70 defines length L1 of first portion 52 of each label 46. Seal line 62 is generally parallel to and spaced from fold line 56 such that the distance between seal line 62 and fold line 56 defines length L2 of second portion 58 of each label 46, which is generally equal to length L1 of first portion 52. The distance from seal line 62 and second section 76 of cut line 70 defines length L3 of third portion 64 of each label 46.

Referring to FIGS. 6 and 9, outer surface 68*a* of first portion 52 of each label 46 includes first indicia 84 printed thereon by ink jet printer 82. It is intended for first indicia 84 on outer surface 68*a* of first portion 52 of label 46 to include first and second arrow heads 86*a* and 86*b*, respectively, spaced between first and second side sections 78 and 80, respectively, of cut line 70 and optically directing a user to fold line 56. More specifically, it is intended for the tips or apexes of first and second arrow heads 86*a* and 86*b*, respectively, to abut fold line 56. First indicia 84 may include instructions 88 for a user to form tab 90, FIGS. 11-12, e.g. "Fold Under Before Application" printed on outer surface 68*a* of first portion 52 of each label 46.

Outer surface 68*b* of second portion 58 of each label 46 includes second indicia 92 printed thereon by ink jet printer 82. It is intended for second indicia 92 on outer surface 68*b* of second portion 58 of each label 46 to include first and second arrow heads 94*a* and 94*b*, respectively, spaced between first and second side sections 78 and 80, respectively, of cut line 70 and optically directing a user to fold line 56. More specifically, it is intended for the tips or apexes of first and second arrow heads 94*a* and 94*b*, respectively, to abut fold line 56. Second indicia 84 may include instructions 96 for a user on use of tab 90, as hereinafter described, printed on outer surface 68*b* of second portion 58 of each label 46. By way of example, instructions 96 may state "Pull Here to Remove."

Outer surface 68*c* of third portion 64 of each label 46 includes third indicia 98 printed thereon by ink jet printer 82. It is intended for third indicia 98 on outer surface 68*c* of third portion 64 of label 46 to optically designate the portion of label 46 used to attach to and interconnect lid 100 to top portion 102 of container 104. Once the printing operation has been completed, label web 10 may be rolled onto core 106 in a conventional manner for storage and transport.

In operation, it is intended for label 46 to attach lid 100 to top portion 102 of container 104. By way of example, container 104 includes top portion 102 having neck 108 projecting therefrom. Neck 108 has an outer surface 110 have threads 112 extending thereabout. Neck 108 terminates at an upper end 114 including an inner edge 116 defining an opening to provide access to interior of 118 of container 104. Stop ring 118 projects radially from outer surface 110 of neck 108 adjacent lower end 120 thereof.

Lid 100 is threadable onto neck 108 of container 104 to prevent access to interior 119 of container 104. Lid 100 includes upper wall 122 having cylindrical skirt 124 depending from the outer periphery thereof. Skirt 124 has internal screw threads 126 projecting from inner surface 128 and adapted for forming a mating relationship with corresponding threads 112 along outer surface 110 of neck 108. Skirt 124 includes terminal edge 130 which is engageable with stop ring 118 with lid 100 threaded onto neck 108 of container 104.

With lid 100 threaded onto neck 108 of container 104, label 46 is removed from label web 10 so as to expose adhesive 31 provided on inner surface 134 of label 46, FIGS. 10-11. Once label 46 is separated from label web 10, first portion 52 of label 46 is folded along fold line 56 over second portion 58 of label 46, in the direction shown by arrow 136. Once first portion 52 of label 46 is folded along fold line 56 over second portion 58 of label 46 and inner surface 134*a* of first portion 52 of label 46 is brought into contact with inner surface 134*b* of second portion 58, adhesive 31 bonds inner surface 134*a* of first portion 52 of label 46 to inner surface 134*b* of second portion 58 of label 46 so as form tab 90, FIGS. 11 and 12. It is intended for adhesive 31 to have sufficient adhesive characteristics such that once inner surface 134*a* of first portion 52 of label 46 is bonded to inner surface 134*b* of second portion 58 of label 46, first and second portions 52 and 58, respectively, cannot be separated.

Referring to FIGS. 12-13, to attach label 46 to lid 100 and top portion 102 of container 104, third portion 64 of label 46 is wrapped around lid 100 and top portion 102 of container

104 such that a first portion of adhesive 31 on inner surface 134*c* of third portion 64 of label 46 affixes to outer surface 124*a* of skirt 124 adjacent to terminal edge 130 and a second portion of adhesive 31 on inner surface 134*c* of third portion 64 of label 46 affixes to stop ring 118 of container 110. It can be appreciated that adhesive 31 on inner surface 134*c* of third portion 64 of label 46 attaches and interconnects lid 100 to top portion 102 of container 104 such that the adhesive attachment of adhesive 31 to lid 100 and to top portion 102 the container 104 substantially inhibits removal of lid 100 from top portion 102 of container 104, thereby sealing any contents within interior 119 of container 104.

To remove label 104 from lid 100 and top portion 102 of container 104, a user can grasp and pull on tab 90 of label 46. Pulling on tab 90 provides a user with sufficient leverage to overcome the adhesive attachment of adhesive 31 on inner surface 134*c* of label 46 to lid 100 and to top portion 102 of container 104, thereby allowing a user to simply and easily remove lid 100 from top portion 102 of container 104.

Various modes of carrying out the invention are contemplated as being within the scope of the following claims particularly pointing out and distinctively claiming a subject matter which applicant regards is the invention.

We claim:

1. A method for sealing a lid removably secured to a top portion of a container, the method comprising the steps of:

providing a strip having first and second ends and first and second sides, the strip including a first portion extending from the first end of the strip, a second portion extending from the first portion, and a third portion extending between the second portion of the strip and the second end of the strip;

printing first indicia on an outer surface of the first portion of the strip, the first indicia including a plurality of marks spaced between the first and second sides of the strip and optically directing a user to a fold line on the strip;

printing second indicia on an outer surface of the second portion of the strip, the second indicia including a plurality of marks spaced between the first and second sides of the strip and optically directing a user to a fold line on the strip, each of the plurality of marks of the second indicia being axially aligned with a corresponding mark of the plurality of marks of the first indicia;

folding the strip such that an inner surface of the first portion of strip binds to an inner surface of the second portion of the strip so as to define a tab on the strip; and affixing an inner surface of the third portion of the strip to the lid and to the top portion of the container to substantially inhibit removal of the lid from the top portion of the container;

wherein the tab is configured to facilitate removal of the third portion of the strip from the lid and the top portion of the container.

2. The method of claim 1 wherein the first indicia includes an arrow head directed at the fold line.

3. The method of claim 2 wherein the second indicia includes an arrow head directed at the fold line.

4. The method of claim 1 comprising the additional step of depositing an adhesive on the inner surface of the first, second and third portions of the strip.

5. The method of claim 4 wherein the adhesive on the inner surface of the third portion of the strip is configured to attach to and interconnect the lid to the top portion of the container such that the adhesive attachment of the adhesive to the lid and to the top portion of the container substantially inhibits removal of the lid from the top portion of the container.

6. The method of claim 1 comprising the additional step of die cutting a plurality of perforations in the strip to define the fold line.

7. The method of claim 1 comprising the additional step of printing a line on the outer surface of the strip to define the fold line.

8. The method of claim 1 including the additional step of printing indicia on an outer surface of the third portion of the strip to optically designate the third portion of the strip.

9. A method for sealing a lid removably secured to a top portion of a container, the method comprising the steps of:

providing a strip having first and second ends and first and second sides, the strip including a first portion extending from the first end of the strip, a second portion extending from the first portion, and a third portion extending between the second portion of the strip and the second end of the strip;

printing first indicia on an outer surface of the first portion of the strip;

printing second indicia on an outer surface of the second portion of the strip;

folding the strip along a fold line such that an inner surface of the first portion of strip binds to an to inner surface of the second portion of the strip so as to define a tab on the strip; and affixing an inner surface of the third portion of the strip to the lid and to the top portion of the container to substantially inhibit removal of the lid from the top portion of the container;

wherein:

the first indicia including a plurality of marks spaced between the first and second sides of the strip and optically directing a user to the fold line on the strip;

the second indicia including a plurality of marks spaced between the first and second sides of the strip and optically directing a user to a fold line on the strip; and each of the plurality of marks of the second indicia being axially with a corresponding mark of the plurality of marks of the first indicia.

10. The method of claim 9 wherein the tab is configured to facilitate removal of the third portion of the strip from the lid and the top portion of the container.

11. The method of claim 9 wherein the first indicia includes an arrow head directed at the fold line.

12. The method of claim 11 wherein the second indicia includes an arrow head directed at the fold line.

13. The method of claim 9 comprising the additional step of depositing an adhesive on the inner surface of the first, second and third portions of the strip.

14. The method of claim 13 wherein the adhesive on the inner surface of the third portion of the strip is configured to attach to and interconnect the lid to the top portion of the container such that the adhesive attachment of the adhesive to the lid and to the top portion of the container substantially inhibits removal of the lid from the top portion of the container.

15. The method of claim 9 comprising the additional step of die cutting a plurality of perforations in the strip to define the fold line.

16. The method of claim 9 comprising the additional step of printing a line on the outer surface of the strip to define the fold line.

17. The method of claim 9 including the additional step of printing third indicia on an outer surface of the third portion of the strip to optically designate the third portion of the strip.

18. The method of claim 9 including the additional step of removably bonding the strip to a substrate, the substrate including a non-binding layer of material affixed thereto.

* * * * *